United States Patent Office 3,322,773
Patented May 30, 1967

3,322,773
TETRAHYDRO-1,10-PHENANTHROLINES
Brian Colwell Ennis, Ripponlea, Victoria, Australia, assignor to Monsanto Chemicals (Australia) Limited, West Footscray, Victoria, Australia, a company of Australia
No Drawing. Filed Sept. 8, 1964, Ser. No. 395,072
Claims priority, application Australia, Sept. 12, 1963, 35,322/63
8 Claims. (Cl. 260—288)

This invention provides new 1,10-phenanthrolines, processes for their preparation and fields for their application. The new compounds of the invention are identifiable as 1,2,3,4-tetrahydro-1,10-phenanthrolines, represented by the structural formula,

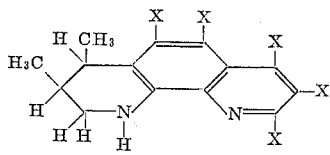

wherein X is selected from hydrogen, methyl and ethyl. The new compounds of the invention are useful inter alia as intermediates for the preparation of the corresponding parent 1,10-phenanthrolines, and as selective herbicides, as described more fully hereinafter.

The specified new 1,2,3,4-tetrahydro-1,10-phenanthrolines can be prepared by several different methods. One method comprises the reaction of a quinoline selected from 8-aminoquinolines and salts of 8-aminoquinolines in which said 8-aminoquinolines are represented by the structural formula,

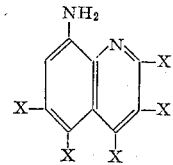

wherein X is selected from hydrogen, methyl and ethyl, with a carbonyl component selected from methyl isopropenyl ketone and precursors which generate such ketone under aqueous acidic conditions, said reaction being effected by heating the quinoline component with the carbonyl component at a temperature up to about 100° C. in the presence of an acidic catalyst. The resultant 1,2,3,4-tetrahydro-1,10-phenanthroline is recovered from the reaction mixture. Recovery of the crude product, which may be purified, is preferably carried out as hereinafter set forth.

Another method of preparing the new 1,2,3,4-tetrahydro-1,10-phenanthrolines of the invention comprises adding to a suspension of an excess of tin in a hot mineral acid, such as hot hydrochloric acid, a 1,10-phenanthroline of the structural formula,

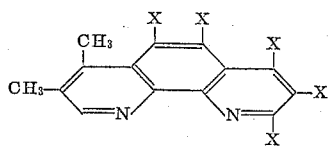

wherein X is selected from hydrogen, methyl and ethyl, said 1,10-phenanthroline conveniently being in the form of a solution in a mineral acid, such as hydrochloric acid. The mixture of said suspension and said solution is diluted with water, the tin complex of the 1,2,3,4-tetrahydro-1,10-phenanthroline present in said mixture is decomposed by treatment with an alkali, such as hot sodium hydroxide solution, and the desired 1,2,3,4-tetrahydro-1,10-phenanthroline is then recovered from the reaction product. Recovery of the crude product, which may be purified, is preferably carried out as described below.

I prefer to prepare the new 1,2,3,4-tetrahydro-1,10-phenanthrolines by the reaction of a quinoline with methyl isopropenyl ketone or a precursor of methyl isopropenyl ketone in the presence of an acid catalyst, as indicated above. Thus, in carrying out the preferred method, the reaction components desirably are heated to a temperature within the range of 30–90° C. I have found that formation of tetrahydrophenanthroline is uneconomically slow below 30° C., and that some degradation of the aminoquinoline may occur above about 100° C., the reaction being complete within about two hours at a temperature of 60–70° C., which is the preferred temperature range. Optimum results are obtained if a slight molar excess of the methyl isopropenyl ketone component or precursor of methyl isopropenyl ketone, based on the aminoquinoline, is used, as there is a tendency for the carbonyl component to be lost through polymerization. The reaction is only slightly exothermic; however, better control of the reaction temperature results if the methyl isopropenyl ketone or precursor component is added gradually to a stirred mixture of the aminoquinoline and acid catalyst. At the end of the reaction, any excess of methyl isopropenyl ketone may be recovered by distillation. The residue is then basified to liberate the desired tetrahydro-1,10-phenanthroline and by-product parent alkyl substituted 1,10-phenanthroline, which is always obtained as a reaction co-product. The desired tetrahydro-1,10-phenanthroline is then separated from the by-product parent 1,10-phenanthroline and may be purified as hereinatfer described.

Utilizing the preferred method of preparation as described above, 1,2,3,4-tetrahydro-3,4,7,8-tetramethyl-1,10-phenantholine can be prepared by reacting 3,4-dimethyl-8-aminoquinoline with methyl isopropenyl ketone or a precursor compound (such as 1-hydroxy-2-methylbutan-3-one, which gives the indicated unsaturated ketone under aqueous acidic conditions) in the presence of an acid catalyst. Examples of 8-aminoquinolines, other than 3,4-dimethyl-8-aminoquinoline, which may be used in the process of the invention include 8-aminoquinoline; 3-methyl-8-aminoquinoline; 2,4-dimethyl - 8 - aminoquinoline; 3,5,6-trimethyl-8-aminoquinoline; 3,4-dimethyl-5,6-diethyl-8-aminoquinoline; 3,4,5,6-tetramethyl - 8 - aminoquinoline; and 4-methyl-8-aminoquinoline. Acid addition salts of the 8-aminoquinolines which can be used in the process of the invention include the salts of the mineral acids, e.g., the hydrochloride or sulfate salts. In some cases, an acid addition salt such as the hydrochloride may be preferred in providing acidic conditions for use in conjunction with precursors for generating the methyl isopropenyl ketone component.

As employed herein, the phase "precursors of methyl isopropenyl ketone" connotes those materials which are readily converted to said ketone upon treatment with mineral acid and water. The nature of such precursors, and their use in Skraup-type reactions, is known to the art.

Methyl isopropenyl ketone and other such β-vinyl ketones are often prepared by condensing an aldehyde with a methylene group which is alpha to the carbonyl group of the ketone, followed by dehydration of the resultant β-hydroxy ketone to the required β-vinyl ketone. Thus, methyl isopropenyl ketone is commonly prepared by condensing formaldehyde with methyl ethyl ketone, which gives 1-hydroxy-2-methylbutan-3-one as intermediate, and this intermediate may be dehydrated by heating in the presence of a mineral acid catalyst to give methyl isopropenyl ketone. Accordingly, it is sometimes more convenient to use such a precursor of methyl isopropenyl ketone as a reactant in the synthesis of the tetrahydro- 1,10-phenanthrolines of this invention, the desired ketone being generated in situ (i.e., by the use of 1-hydroxy-2-methylbutan-3-one as the carbonyl component). Precursors of methyl isopropenyl ketone useful for carrying out the process of the invention can be represented by the structural formulae,

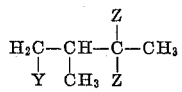

and

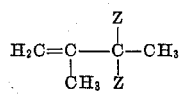

and

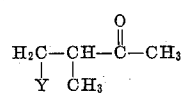

wherein Y is selected from hydroxy, alkoxy, acetoxy and halogen; and wherein Z is selected from alkoxy, acetoxy and halogen. In these cases, the alkyl and alkoxy groups preferably contain from 1 to 4 carbon atoms, and the halogen is preferably chlorine. Examples of such precursors, other than 1-hydroxy-2-methylbutan-3-one, include 1-chloro-2-methylbutan-3-one; 1-alkoxy-2-methylbutan-3-ones; methyl isopropenyl ketone diacetate; 1,3,3-trialkoxy-2-methylbutanes; and 1,3,3-trichloro-2-methylbutane.

The acid catalyst used in the preferred method may be an organic acid selected from formic, acetic, propionic and butyric acids, or a mineral acid selected from hydrochloric, hydrobromic, hypophosphorous and sulfuric acids. Acids such as nitric or arsenic acids, which can function as oxidizing agents, should not be used. The amount of acid taken may be varied within wide limits. With the weaker acids, it is generally necessary to have sufficient acid to at least neutralize the basicity of the aminoquinoline, the amount of acid used usually being governed by the solubility of the amine salt. A minimum of one mol of acid catalyst, based on the aminoquinoline component, should be employed, preferably in excess of one mol of acid being used. Acetic acid is particularly convenient for use as the acid catalyst, since an excess of acetic acid serves as a good solvent for both the reaction components and products. However, other solvents or diluents such as water, or inert organic liquids such as benzene, may be used for the reaction components and products.

The desired tetrahydro-1,10-phenanthroline present in the reaction product of the preferred method can be readily separated from the by-product parent 1,10-phenanthroline and then purified by conventional means. The tetrahydro-1,10-phenanthrolines are freely soluble in nonpolar solvents, whereas the by-product parent 1,10-phenanthrolines are virtually insoluble in such solvents. A preliminary separation from by-product 1,10-phenanthroline is therefore easily achieved by extraction of the neutralized reaction product indicated with a solvent such as petroleum ether, cyclohexane or benzene. The tetrahydro-1,10-phenanthroline in the extract may then be further purified by chromatography, crystallization or fractional distillation under reduced pressure or by a combination of these methods. As the tetrahydro-1,10-phenanthroline is a low-melting solid, it is also convenient to prepare the picrate or trinitro fluorenone complex, both of which are high-melting solids which can be readily purified by crystallization, the desired tetrahydro-1,10-phenanthroline then being regenerated from the purified derivatives.

The following non-limitative practical examples illustrate the preparation of the new compounds of the invention.

*Example 1*

A solution of 3,4-dimethyl-8-aminoquinoline (5 g.) in hydroxymethyl butanone ( 4 ml.) and glacial acetic acid (5 ml.) was stirred on a steam bath for one hour. It was then diluted with water (100 ml.) and extracted with benzene. The aqueous layer was neutralized with sodium hydroxide solution, and the resultant solid was washed with cold benzene (20 ml.). The combined benzene extracts were washed with water, dried ($MgSO_4$) and chromatographed on a column of alumina. The impure tetrahydro - 1,10-phenanthroline was obtained as a thick yellow oil which slowly crystallized (3.0 g.; 45%). This was purified by way of the picrate, M.P. 195.5–196° C., from which the base was recovered by treatment with 10% sodium hydroxide solution. Crystallization from methanol then gave the 1,2,3,4-tetrahydro-3,4,7,8-tetramethyl-1,10-phenanthroline as yellow needles, M.P. 7272.4° C. *Analysis.*—Found: C, 80.0; H, 8.3; N, 11.7 for $C_{16}H_{20}N_2$ and requires C, 79.9; H, 8.4; N, 11.7%.

*Example 2*

3,4-dimethyl-8-aminoquinoline (3.4 g.) and hydroxymethylbutanone (2.5 g.) were heated under reflux in aqueous hypophosphorous acid (20 ml.) for one hour. The reaction mixture was diluted with water and neutralized with sodium hydroxide solution. The solid was recovered, dried and extracted with petroleum ether (B.P. 40–60° C.). The tetrahydro-1,10-phenanthroline in this extract was purified as in Example 1, giving a yield of 40%.

*Example 3*

Repetition of Example 2 with sulfuric acid (40% w./w.) in place of the hypophosphorus acid gave a yield of tetrahydro-1,10-phenanthroline of 34% of the theoretical.

Dehydrogenation or oxidation of the new 1,2,3,4-tetrahydro-1,10-phenanthrolines of the invention, so as to form the parent 1,10-phenanthrolines, can be effected by a number of methods; for example, by (a) using arsenic acid plus hydrochloric or hydrobromic acid mixtures, or (b) using sulfur, or (c) using air/platinum dioxide oxidation. The preferred method is the use of arsenic acid/hydrochloric acid mixtures, the tetrahydro-1,10-phenanthroline being oxidized smoothly to the parent 1,10-phenanthroline by heating with such acid mixtures. According to the preferred method, a 1,2,3,4-tetrahydro-1,10-phenanthroline as specified is heated at a temperature within the range of 110–130° C. in the presence of arsenic acid in association with a hydrohalic acid selected from hydrochloric acid and hydrobromic acid, and the resultant alkyl substituted 1,10-phenanthroline of the structural formula,

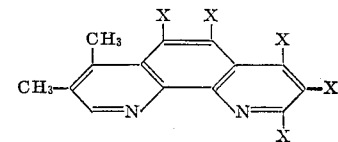

wherein X is selected from hydrogen, methyl and ethyl, is recovered from the reaction mixture.

The dehydrogenation or oxidation reaction is slow, between about 5–10 hours and generally about 7 hours being required for completion at the reflux temperature at atmospheric pressure. Reaction time can be reduced by operating at higher pressures and temperatures. Using a hydrochloric acid/arsenic mixture as the dehydrogenation or oxidation reagent, a reaction time of 6–8 hours is required at the reflux temperature of the mixture for complete conversion of said tetrahydro compound to the desired 1,10-phenanthroline. Hydrochloric acid is preferred to hydrobromic acid since it is cheaper and freely avialable. It also gives a satisfactorily fast reaction rate and high yield of the desired product. A minimum of 3 mols of such acid, based on the tetrahydro compound, should be used, the maximum amount not being particularly critical. As much as 20 mols is usable, and about 10 to 15 mols is usually required in order to maintain a suitably fluid reaction mixture for ease of working. The concentration of such acid is not critical, but it is preferably adjusted so that the final mixture approximates the constant boiling mixture at atmospheric pressure. The arsenic acid is used in the form of arsenic pentoxide or as the 80% arsenic acid of commerce. The minimum amount of arsenic used in the process should be 2 mols beased on the tetrahydro compound, preferably not more than 3 mols being used due to the cost of arsenic acid.

The following non-limitative practical example illustrates the preparation of the parent 3,4,7,8-tetraalkyl-1,10-phenanthroline from the corresponding tetrahydrophenanthroline using hydrochloric acid/arsenic acid as the dehydrogenation or oxidation medium.

*Example 4*

1,2,3,4-tetrahydro - 3,4,7,8 - tetramethyl - 1,10-phenanthroline (0.4 g.) was heated under reflux for 7½ hours with concentrated hydrochloric acid (15 ml.) and 80% arsenic acid (1 ml.). The reaction mixture was poured into water (15 ml.) and neutralized with sodium hydroxide solution. The resulting solid was dried and extracted with benzene, leaving the parent 1,10-phenanthroline (0.38 g., 97%), M.P. 272–277° C.

Another method for the dehydrogenation of the tetrahydro-1,10-phenanthroline to the parent 1,10-phenanthroline as indicated involves reaction of the tetrahydro-1,10-phenanthroline compound with sulfur. The tetrahydro-1,10-phenanthroline is stirred and heated with sulfur at a temperature of 130–160° C., preferably at 140–150° C. Hydrogen sulfied is evolved, and the melt slowly solidifies as the parent 1,10-phenanthroline is formed. An excess of sulfur may be used to serve as a diluent if required. At the end of the reaction, the parent 1,10-phenanthroline may be extracted from the excess of sulfur with dilute acid and purified by usual procedures. The following non-limitative practical example illustrates this particular method.

*Example 5*

1,2,3,4 - tetrahydro - 3,4,7,8 - tetramethyl - 1,10-phenanthroline (1.0 g.) and sulfur (1.0 g.) were stirred together at 140–145° C. for 6 hours. The product was cooled, crushed and extracted with dilute sulfuric acid. Neutralization of the acid extract gave a solid, which was collected, washed with water, dried and extracted with a small amount of benzene to give the parent tetramethyl - 1,10-phenanthroline, 0.69 g. (70%), M.P. 270–275° C.

Yet another method for the dehydrogenation of the tetrahydro-1,10-phenanthroline to the parent 1,10-phenanthroline as indicated involves oxidation with air/platinum dioxide. The tetrahydro-1,10-phenanthroline, at a temperature of about 200° C., is contacted with air in the presence of platinum dioxide as a catalyst. Dehydrogenation proceeds at a satisfactory rate, and the parent 1,10-phenanthroline is formed in about 60% yield. Alternatively, the reaction can conveniently be carried out at lower temperatures, using acetic acid as a reaction medium. The following non-limitative practical example illustrates this particular method.

*Example 6*

1,2,3,4-tetrahydro - 3,4,7,8-tetramethyl - 1,10-phenanthroline (0.2 g.) and platinum dioxide (20 mg.) were heated under reflux in acetic acid (10 ml.) for 6 hours, while a slow stream of air was passed through the mixture. The mixture was diluted with water (200 ml.) and filtered. The filtrate was basified, and the resultant product was washed with benzene to give the parent 1,10-phenanthroline (0.12 g.), M.P. 274–278° C.

Besides being useful as intermediates for the preparation of the parent 1,10-phenanthrolines, the new 1,2,3,4-tetrahydro-1,10-phenanthrolines of the invention are useful inter alia in the destruction of undesired vegetation and in the selective control or inhibition of plant growth. Thus, said tetrahydro-1,10-phenanthrolines act as postemergent herbicides toward a variety of plants, but have no effect upon wild oats, a plant related to wheat, which enables said compounds to find application as a selective herbicide. Desirable herbicidal effects can be obtained by the application of small amounts, e.g., one-half pound per acre, of any of the compound. However, larger amounts as high as fifty pounds per acre may be necessary or desirable in some instances. For general application as a pre-emergence herbicide, amounts in the range of 0.5–25 pounds per acre of the compound can be used, greater selectivity being obtained at the lower concentration. Herbicidal activity of the new tetrahydro-1,10-phenanthroline compounds was ascertained in experiments conducted on pre-emergence and post-emergence or contact herbicidal screening tests on plants using the following species of plants:

A. Grass
B. Broadleaf
C. Morning glory
D. Wild oat
E. Bromegrass
F. Ryegrass
G. Radish
H. Sugar beet
I. Foxtail
J. Crabgrass
K. Pigweed
L. Soybean
M. Wild buckwheat
N. Tomato
O. Sorghum The results of the tests are recorded in Table I below.

In the pre-emergence herbicidal screening tests, aluminium tins with perforated bottoms were filled to a depth of 2⅜". Seeds of each species were laid on the surface of the soil and covered with soil to the top edge of the pans (⅜"), which were then placed on a flooded greenhouse bench. Each 9" x 13" pan was sprayed with a solution of the candidate herbicide at the rate specified in Table I. The spray was then applied uniformly to the surface of the soil. The procedure for evaluating contact herbicidal activity was similar to the above-described pre-emergence treatment, except that the seeds were allowed to germinate and grow for a period of 14 to 21 days before spraying each pan with 6 cc. of a 0.5% solution of the candidate herbicide. The herbicidal ratings, both post-emergence or contact and pre-emergence, recorded in Table I are:

(4) Plant dead
(3) Severe phytotoxicity
(2) Moderate phytotoxicity
(1) Slight phytotoxicity
(0) No phytotoxicity

TABLE I

| Treatment | Herbicidal Activity | | | | | | | | | | | | | | |
|---|---|---|---|---|---|---|---|---|---|---|---|---|---|---|---|
| | A | B | C | D | E | F | G | H | I | J | K | L | M | N | O |
| 25 lb./acre 1,2,3,4-tetrahydro-3,4,7,8-tetramethyl-1,10-phenanthroline | 0 | 1 | 2 | 0 | 0 | 0 | 2 | 3 | 0 | 3 | 0 | 0 | 0 | 0 | 0 |
| 0.5% contact 1,2,3,4-tetrahydro-3,4,7,8-tetramethyl-1,10-phenanthroline | 2 | 2 | 0 | 0 | 4 | 2 | 4 | 3 | 4 | 4 | 4 | 3 | 1 | 4 | 2 |

In employing the tetrahydrophenanthrolines of this invention, it will be recognized that these compounds can be applied to the plant parts. As is apparent from the demonstrated pre- and post-emergent activity, the phrase "plant parts" includes not only stems, branches and foliage, but also roots and germinant seeds as well.

In the field application of the compounds of the invention, they are most conveniently applied as herbicidal compositions containing from about 0.5% to about 95% by weight of the active compound. These herbicidal compositions or formulations can be prepared by admixing the active compound, or a mixture of such compounds, with an inert carrier or diluent material, the resultant compositions being ready for application to soil containing undesired post-emergent or pre-emergent vegatation, using conventional equipment for the purpose. Thus, the herbicidal compositions or formulations can be prepared in the form of solids or liquids.

Solid compositions are preferably in the form of dusts and are compounded to give homogeneous, free-flowing dusts by admixing the compound with finely-divided inert carriers such as talcs, clays, lime, bentonite, pumice, fuller's earth, pyrophyllite, diatomaceous earth, or flours such as walnut shell, wheat, redwood, soya bean, cottonseed flours and other inert solid materials of the kind conventionally employed in preparing herbicidal compositions in dusts or powdered form. On the other hand, such inert carriers can be impregnated with the present compounds by means of a volatile solvent. These carriers or diluents can represent a substantial portion (for example, 50-95% by weight) of the entire formulation as applied.

Liquid herbicidal compositions can be prepared by admixing the new compounds of the invention with a suitable liquid inert carrier or diluent. The new tetrahydrophenanthorilnes of the invention are not water-soluble. However, they are soluble in organic solvents such as kerosene, xylene, toluene and high-aromatic naphthas. The proportion of such organic solvent to be used in the formulations will depend upon the solubility of the active compound and may require as little as 1% or as much as 90% or more in order to provide a uniformly distributed formulation.

The herbicidal compositions of the invention, whether in the form of dusts or liquids, preferably include also an organic surfactant of the kind sometimes referred to in the art as a wetting, dispersing or emulsifying agent. These surfactants have several functions, such as causing the compositions to be easily dispersed in water to give aqueous sprays which, for the most part, constitute desirable media for most applications. They also help in wetting the surfaces of the undesired plants to which a formulation is applied. The organic surfactants employed can be of the anionic, cationic or nonionic type. Generally, the surfactants will be only a minor proportion of the formulation as used, for example, less than 15% and frequently as low as 0.05% by weight of the composition. Usually concentrations of from 0.5% to 5% are found to be optimum.

Thus, the new compounds can be incorporated into absorbent materials such as clays, fuller's earth and the like, together with wetting agents such as alkyl naphthalene sulfonate and dispersing agents such as lignin sulfonates, to produce a water-dispersible powder which can be suspended in water as a carrier and sprayed onto the soil so as to provide a treatment of 0.5-25 pounds per acre. Emulsifiable herbicidal concentrates of the new compounds can likewise be formulated, for example, using kerosene, xylene, toluene or a high aromatic naphtha as solvent, the emulsifier used being nonionic, such as the octyl or nonyl phenol-ethylene oxide derivatives, e.g., "Triton X100," or preferably blends of nonionics with oil-soluble anionic surfactants such as the calcium salt of an alkyl aryl sulfonate. A blend known as "Emcol M500X" gives particularly good results. The emulsifiable concentrate may contain between 20% and 30% of the active compound on a weight/volume basis.

Examples of emulsifiable formulations in accordance with the invention are as follows:

(1)

| | Gm. |
|---|---|
| Active compound | 40 |
| Triton X100 [1] | 8 |
| Triton X165 [1] | 2 |
| High aromatic naphtha [2] to 100 mls. | |

(2)

| | |
|---|---|
| Active compound | 40 |
| Emcol H500X [3] | 10 |
| Xylene to 100 mls. | |

[1] "Triton" is the trademark of Rohm & Haas Co., U.S.A.
[2] High aromatic naphtha, e.g., Sovacide PY (a Vacuum Oil product) or solvent 250/300 (an Esso product).
[3] "Emcol" is the trademark of Emulsol Corporation, U.S.A.

These concentrates can be readily mixed with water as a carrier and sprayed onto weeds or the soil so as to provide a treatment of 0.5 to 25 pounds per acre.

While the invention has been described herein with regard to certain specific embodiments, it is not so limited. It is to be understood that variations and modifications thereof may be made by those skilled in the art without departing from the spirit and scope of the invention.

What is claimed is:
1. A compound of the formula,

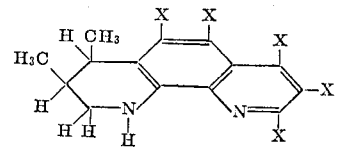

wherein each X is selected from the group consisting of hydrogen, methyl and ethyl.

2. 1,2,3,4 - tetrahydro - 3,4,7,8 - tetramethyl-1,10-phenanthroline.

3. 1,2,3,4 - tetrahydro - 7,8 - dimethyl-1,10-phenanthroline.

4. 1,2,3,4-tetrahydro-3,7,8 - trimethyl - 1,10 - phenanthroline.

5. 1,2,3,4 - tetrahydro - 2,4,7,8 - tetramethyl - 1,10-phenanthroline.

6. 1,2,3,4-tetrahydro - 3,5,6,7,8 - pentamethyl - 1,10-phenanthroline.

7. 1,2,3,4 - tetrahydro - 3,4,7,8-tetramethyl-5,6-diethyl-1,10-phenanthroline.

8. 1,2,3,4 - tetrahydro - 3,4,5,6,7,8-hexamethyl-1,10-phenanthroline.

References Cited

UNITED STATES PATENTS

| 2,640,830 | 6/1953 | Druey | 260—288 |
| 2,651,636 | 9/1953 | Wheeler | 260—288 |
| 2,886,568 | 5/1959 | Stansbury et al. | 260—283 |
| 3,069,252 | 12/1962 | Josephs | 71—2.5 |
| 3,189,428 | 6/1965 | Mussell | 71—2.5 |

FOREIGN PATENTS 282,274  6/1952  Switzerland.

OTHER REFERENCES

Badger et al.: Aust. J. Chem., vol. 16, 814 to 827, 840 to 844 (1963).

Case: J. Am. Chem. Soc., vol. 70, pp. 3994 to 3996 (1948).

Elderfield: Heterocyclic Chemistry, vol. IV, Wiley, 1952, pp. 21 to 24 and 394 to 400.

Grigg et al.: Aust. J. Chem., vol. 15, 864 to 866 (1962).

ALEX MAZEL, *Primary Examiner.*

D. G. DAUS, *Assistant Examiner.*